(12) United States Patent
Bonneau et al.

(10) Patent No.: US 8,899,913 B2
(45) Date of Patent: Dec. 2, 2014

(54) ASSEMBLY INCLUDING A TURBINE DISK FOR A GAS TURBINE ENGINE AND A BEARING-SUPPORTING JOURNAL, AND COOLING CIRCUIT FOR THE TURBINE DISK OF SUCH AN ASSEMBLY

(75) Inventors: Damien Bonneau, Melun (FR); Fabrice Garin, Boissise la Bertrand (FR); Maurice Guy Judet, Dammarie les Lys (FR); Thomas Langevin, Brunoy (FR)

(73) Assignee: Snecma, Paris (FR)

( * ) Notice: Subject to any disclaimer, the term of this patent is extended or adjusted under 35 U.S.C. 154(b) by 1006 days.

(21) Appl. No.: 12/994,785

(22) PCT Filed: May 29, 2009

(86) PCT No.: PCT/EP2009/056617
§ 371 (c)(1),
(2), (4) Date: Nov. 26, 2010

(87) PCT Pub. No.: WO2009/144300
PCT Pub. Date: Dec. 3, 2009

(65) Prior Publication Data
US 2011/0129336 A1    Jun. 2, 2011

(30) Foreign Application Priority Data
May 29, 2008  (FR) ..................................... 08 02945

(51) Int. Cl.
*F01D 5/08*    (2006.01)
*F01D 5/06*    (2006.01)
*F01D 25/12*   (2006.01)

(52) U.S. Cl.
CPC .............. *F01D 5/082* (2013.01); *Y02T 50/671* (2013.01); *Y02T 50/676* (2013.01); *F01D 25/12* (2013.01); *F01D 5/066* (2013.01); *F01D 5/085* (2013.01)
USPC ......................................................... 415/115

(58) Field of Classification Search
USPC ............ 415/115, 174.5, 173.7; 416/93 R, 95, 416/96 R, 97 R
See application file for complete search history.

(56) References Cited

U.S. PATENT DOCUMENTS 2,654,220 A * 10/1953 Boestad et al. ............. 60/39.511
3,343,806 A *  9/1967 Bobo et al. .................... 415/115
(Continued)

FOREIGN PATENT DOCUMENTS

EP    1 533 473    5/2005
EP    1 921 255    5/2008
(Continued)

OTHER PUBLICATIONS

International Search Report issued Sep. 8, 2009 in PCT/EP09/56617 filed May 29, 2009.

*Primary Examiner* — Ned Landrum
*Assistant Examiner* — Joshua R Beebe
(74) *Attorney, Agent, or Firm* — Oblon, Spivak, McClelland, Maier & Neustadt, L.L.P.

(57) ABSTRACT

An assembly with a turbine disk for a gas turbine engine and a bearing-supporting journal, the turbine disk having a radial annular fastening flange secured to a radial annular part of the journal by bolts, the bolts passing successively through fastening bores formed in the radial annular fastening flange of the turbine disk and in the radial annular part of the journal, the radial annular part of the journal having air circulation openings, the openings being formed between the fastening bores of the journal.

9 Claims, 3 Drawing Sheets

(56) References Cited

U.S. PATENT DOCUMENTS

| | | | |
|---|---|---|---|
| 3,356,340 A * | 12/1967 | Bobo | 415/115 |
| 3,565,545 A | 2/1971 | Bobo et al. | |
| 3,765,795 A * | 10/1973 | Koff | 416/198 R |
| 4,657,482 A * | 4/1987 | Neal | 415/176 |
| H903 H | 4/1991 | Weinstein | |
| 5,052,891 A * | 10/1991 | Burkholder | 416/198 A |
| 5,350,278 A * | 9/1994 | Burge | 416/198 A |
| 6,283,712 B1 * | 9/2001 | Dziech et al. | 416/179 |
| 6,361,277 B1 * | 3/2002 | Bulman et al. | 416/96 R |
| 6,499,957 B1 * | 12/2002 | Klingels et al. | 416/198 A |
| 7,210,909 B2 * | 5/2007 | Escure et | 416/198 A |
| 2005/0111964 A1 | 5/2005 | Krammer et al. | |
| 2005/0246889 A1 * | 11/2005 | Charrier et al. | 29/700 |
| 2008/0112793 A1 * | 5/2008 | Lee et al. | 415/115 |
| 2010/0284811 A1 | 11/2010 | Druez et al. | |

FOREIGN PATENT DOCUMENTS

| | | |
|---|---|---|
| GB | 2 119 861 | 11/1983 |
| JP | 2005 069167 | 3/2005 |

* cited by examiner though which part 12 of the HP journal 10 being difficult to access by the machining tools. Furthermore, after machining, the ventilation through openings 11 have sharp edges with a concentration of fatigue stresses which are liable to weaken the HP journal 10 during its operation.

ASSEMBLY INCLUDING A TURBINE DISK FOR A GAS TURBINE ENGINE AND A BEARING-SUPPORTING JOURNAL, AND COOLING CIRCUIT FOR THE TURBINE DISK OF SUCH AN ASSEMBLY

BACKGROUND OF THE INVENTION

1. Field of the Invention

The present invention relates to the field of twin-spool gas turbine engines and, more particularly, to the cooling of a high-pressure turbine disk of a twin-spool gas turbine engine.

2. Description of the Related Art

A twin-spool turbojet with a front fan, for example, comprises a low-pressure spool, termed LP spool, and a high-pressure spool, termed HP spool.

By convention, in the present application, the terms "upstream" and "downstream" are defined with respect to the direction in which the air circulates in the turbojet. Thus, a twin-spool turbojet with a front fan comprises conventionally, from upstream to downstream, a fan, an LP compressor stage, an HP compressor stage, a combustion chamber, an HP turbine stage and an LP turbine stage.

The shaft of the LP spool is guided in its rotation in bearings supported by the fixed structure of the engine whereas the shaft of the HP spool is guided by bearings supported by the LP spool, the shafts of the two spools being concentric.

During the operation of the turbojet, a mixture of air and fuel is burnt in the combustion chamber of the engine in order to create the thrust necessary to move the aircraft on which the turbojet is mounted. After combustion, a flow of gas at a very high temperature circulates in the HP turbine of the turbojet.

The elements of the turbine, in particular the turbine disk of the HP spool, designated hereinafter as HP turbine disk, are subjected to very high temperatures. In order to protect the HP turbine disk, cooling circuits are formed in the engine, in which circuits air, extracted upstream of the HP turbine, circulates, from upstream to downstream in the turbojet, inside the HP turbine disk and outside the LP shaft. The circuit for cooling the HP turbine disk is designated as circuit for cooling the bore of the turbine disk, better known as "circuit bore cooling".

After having cooled the HP turbine disk, the cooling air passes through a plurality of ventilation openings formed in the journal secured to the HP disk and mounted downstream of the latter, the journal being designated hereinafter as HP journal. The HP journal comprises, inter alia, a ring for the mounting of the bearing 17 making it possible to guide the HP spool on the LP shaft, as represented in FIG. 1.

Still with reference to FIG. 1, the HP journal 10 is fastened by its upstream end to the HP turbine disk 20, the HP turbine disk 20 comprising a radial annular fastening flange 25 coming into contact with a radial annular part 15 of the HP journal 10. The fastening flange 25 of the HP turbine disk 20 is bolted to the HP journal 10 by longitudinal bolts 2.

The ventilation through openings 11 of the HP journal 10, allowing the evacuation of the cooling air flow, are formed downstream of the HP journal part 10 which is bolted to the HP turbine disk 20. In a conventional manner, the ventilation through openings 11 are formed in a frustoconical part 12 of the HP journal 10, which part is flared in the upstream direction and which is highly stressed mechanically in operation.

The ventilation through openings 11 are machined obliquely in the frustoconical part 12 of the HP journal 10. In other words, the ventilation openings 11 are not orthogonal to the surface of the frustoconical part 12 of the HP journal 10. These oblique openings 11 are difficult to machine, the frus-

BRIEF SUMMARY OF THE INVENTION

In order to eliminate these disadvantages, the applicant proposes an assembly including a turbine disk for a gas turbine engine and a bearing-supporting journal, the turbine disk comprising a radial annular fastening flange secured to a radial annular part of the journal by bolts, the bolts passing successively through fastening bores formed in the radial annular fastening flange of the turbine disk and in the radial annular part of the journal, which assembly is characterized in that the radial annular part of the journal comprises air circulation openings, the openings being formed between the fastening bores of the journal.

The openings for the circulation of the cooling air flow are formed on the radial annular part of the journal between the fastening bores of the journal. That advantageously makes it possible to distribute the mechanical stresses over said radial annular part of the journal between the fastening bores and the cooling openings, the level of mechanical stress for each bore and each opening then being lower.

The fastening flange is easily accessible, thereby facilitating the machining of the evacuation openings which can thus be formed at the same time as the fastening bores.

Furthermore, the frustoconical part of the journal no longer performs a cooling air evacuation function, thereby advantageously making it possible to add some material to this part in order to increase the mass in the vicinity of the axis of rotation of the journal (which is also the axis of the engine) and thus reduce the fatigue generated by the rotation of the journal.

Preferably, the radial annular fastening flange of the turbine disk takes the form of a crenelated radial annular band comprising teeth separated by crenels, the fastening bores of the turbine being formed in the teeth of said crenelated band.

The radial annular fastening flange is advantageously crenelated in order to reduce the mass of the turbine while allowing the fastening of the turbine to the journal.

Preferably again, the crenels of the radial annular fastening flange are arranged in order, during the fastening of the turbine to the journal, to correspond with the air circulation openings formed on the radial annular part of the journal.

Thus, the air flow circulates successively between the teeth of the fastening flange of the turbine and in the air circulation openings of the journal.

Preferably, the circulation openings and the fastening bores are arranged circumferentially on the radial annular part of the journal. The mechanical stresses are uniformly distributed over the periphery of the journal, avoiding the formation of zones of weakness.

According to one particular feature, the journal comprises a frustoconical part, downstream of its radial annular part, comprising an inner radial portion, close to the axis of rotation, which is thickened so as to provide the disk with mechanical strength, the distribution of the masses thus being optimized. The frustoconical part of the journal performs a role of mechanical reinforcement and makes it possible to limit the impact of the centrifugal forces on the journal.

Preferably, a sealing disk, mounted downstream of the journal, is bolted with the journal and the turbine disk, the sealing disk comprising circulation openings which are aligned with the circulation openings of the journal.

The sealing disk advantageously makes it possible to provide sealing while allowing the passage of the air for cooling the turbine disk.

Preferably, the passage cross section of the circulation openings of the sealing disk is adapted in order to calibrate the circulation flow rate of the air flow.

The sealing disk is a light mechanical part which is simple to machine.

By adapting the passage cross section of the circulation openings of the sealing disk, it is possible to calibrate in a simple manner the circulation flow rate of the air flow.

The invention also relates to a cooling circuit for the turbine disk in a gas turbine engine comprising an evacuation passage, downstream of the turbine disk, passing through said openings of an assembly as described above.

Preferably, the cooling circuit comprises an upstream passage through a central bore of the turbine disk, upstream of the openings of said assembly.

Preferably again, the cooling circuit in a twin-spool engine comprises a high-pressure turbine and a low-pressure turbine, the turbine of said assembly being the high-pressure turbine. The circuit comprises a downstream passage, formed downstream of the openings of said assembly, in order to cool in part the low-pressure turbine.

BRIEF DESCRIPTION OF THE DRAWINGS

The invention will be better understood with the aid of the appended drawing, in which.

DETAILED DESCRIPTION OF THE INVENTION

A twin-spool turbojet with a front fan, for example, comprises a low-pressure spool, termed LP spool, and a high-pressure spool, termed HP spool.

By convention, in the present application, the terms "inner" and "outer" are defined radially with respect to the axis of the engine. Thus, a cylinder extending along the axis of the engine comprises an inner face directed toward the axis of the engine and an outer surface, on the opposite side to its inner surface.

Figure 1:
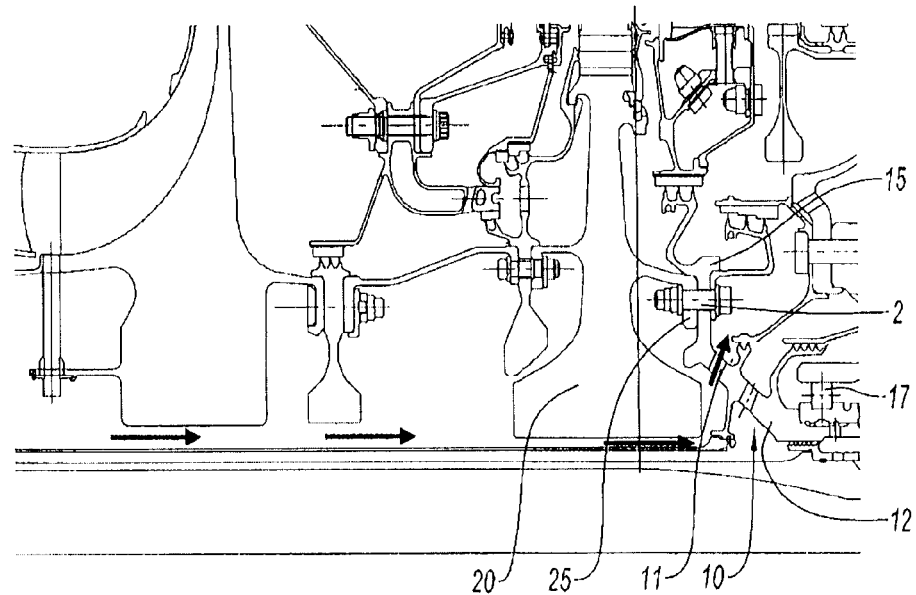
FIG. 1 represents a view in axial section of a turbojet comprising a circuit for cooling the turbine disk of a turbojet according to the prior art.
Figure 2:
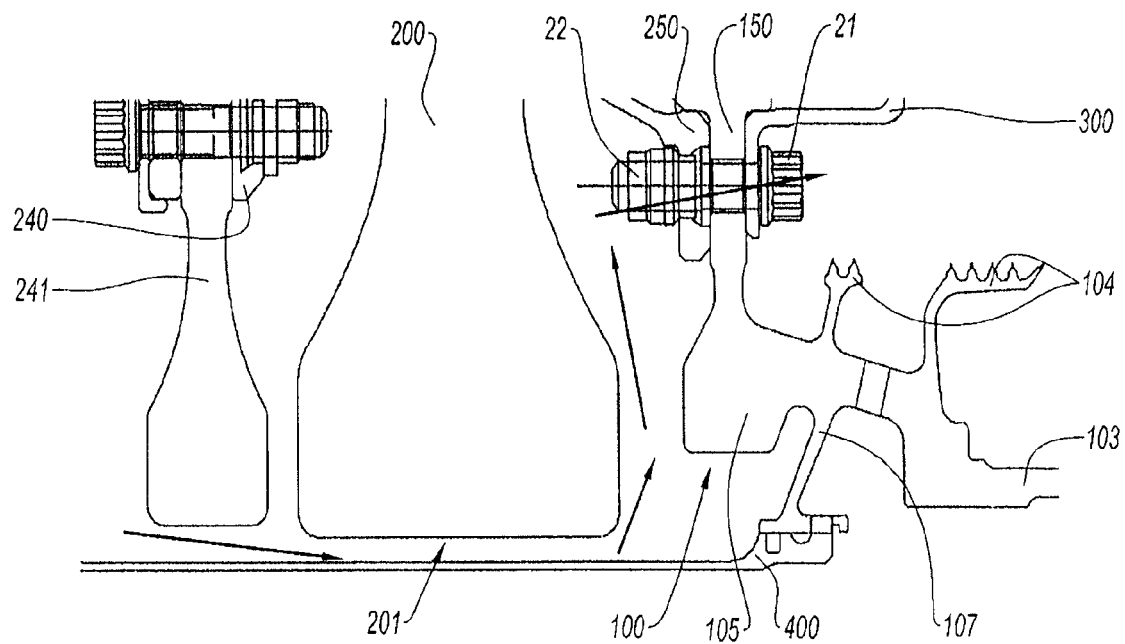
FIG. 2 represents a view in axial section of a turbojet comprising a circuit for cooling the turbine disk of a turbojet according to the invention.
Figure 3:
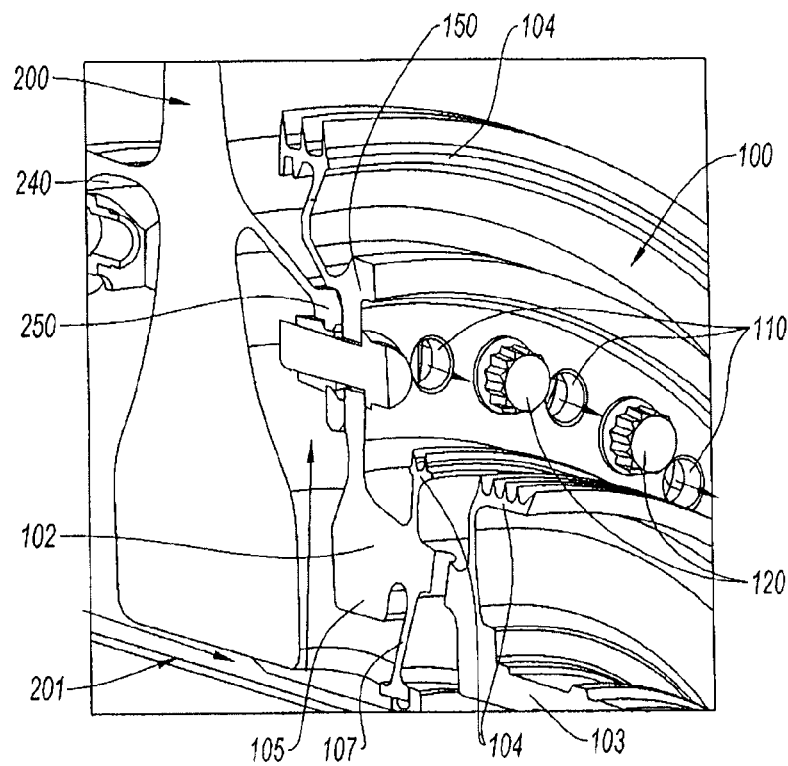
FIG. 3 represents a perspective view of a turbine disk and of a journal of a turbojet according to the invention, the disk and the journal being represented partially.

With reference to FIGS. 2 and 3, the HP turbine stage comprises an HP turbine disk 200 which is mounted securely with an HP journal 100, upstream of the latter.

The HP Turbine Disk 200

The HP turbine disk 200 takes the form of a bladed wheel whose blades extend radially and externally with respect to the axis of the engine. The HP turbine disk 200 comprises a central bore 201 through which the LP shaft passes. The thickness of the HP turbine disk 200 is not uniform, the disk 200 comprising a circumferential bulge in the vicinity of its central opening 201. In other words, the HP turbine disk 200 comprises centrally an axial overthickness, for mechanical reinforcement, so as to increase the mass of the disk 200 in the vicinity of the axis of the engine and thus reduce the mechanical stresses in operation.

With reference to FIG. 3, the HP turbine disk 200 comprises an upstream radial annular fastening flange 240 bolted to a drum associated with a member 241 for supporting sealing strips and guiding the air for cooling the turbine blades, the drum being bolted to the HP compressor of the engine. The drum makes it possible to transmit to the HP compressor the engine combustion energy recovered by the turbine disk 200.

Figure 4:
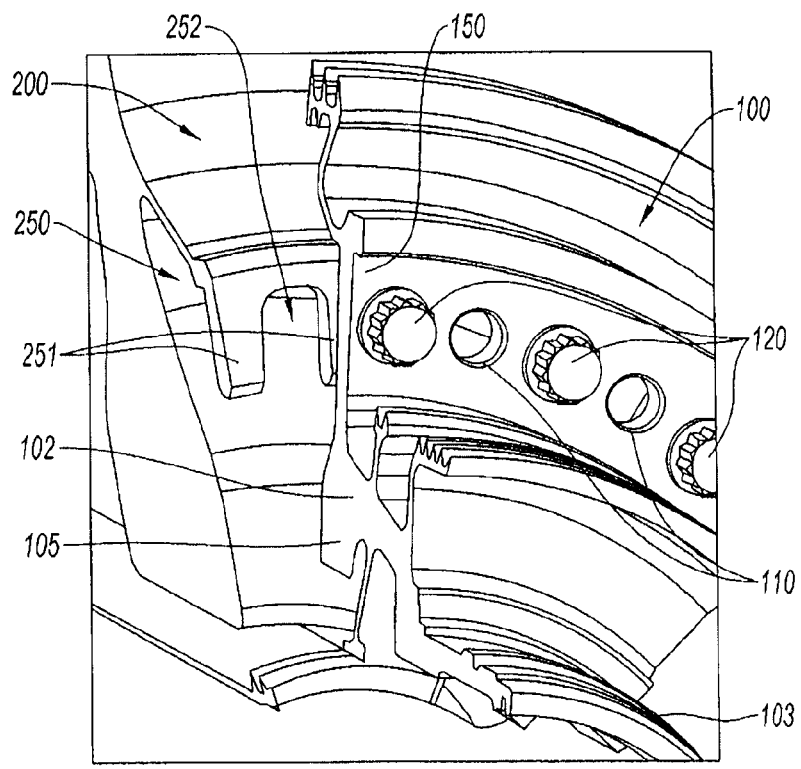
FIG. 4 represents the turbine disk and a part of the journal of FIG. 3.
Figure 5:
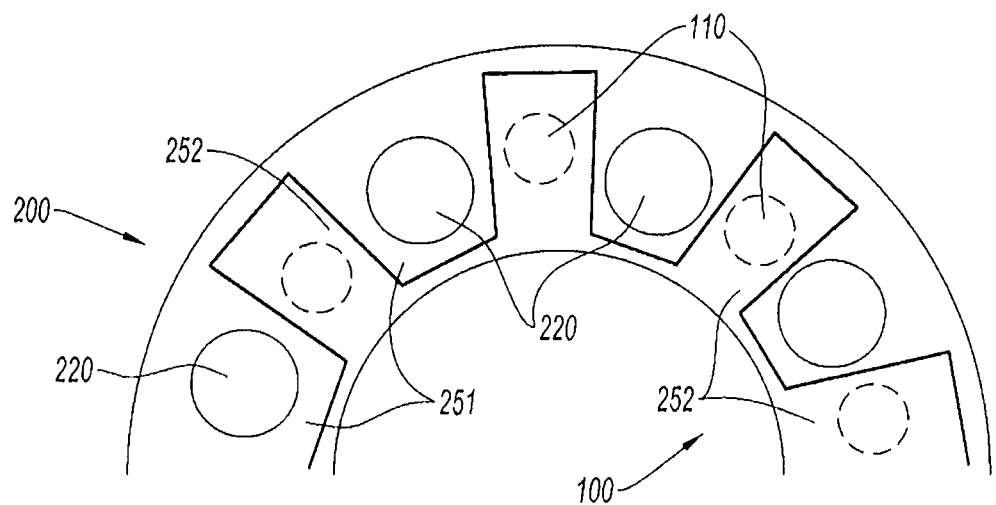
FIG. 5 represents schematically, in cross section, the fastening of the turbine disk to the journal of FIG. 4, seen from upstream to downstream.

The HP turbine disk 200 comprises a downstream radial annular fastening flange 250 intended to maintain the HP journal 100 mounted downstream. The downstream flange 250 takes the form of a crenelated radial annular band 250 comprising teeth 251 separated by crenels 252 as represented in FIGS. 4 and 5. Hereinafter, a crenel is defined as the space between two successive teeth 251 of the crenelated band 250.

With reference to FIG. 5, the teeth 251 of the downstream fastening flange 250 (represented in hatching) extend radially toward the axis of the engine and are directed toward the central bore 201 of the turbine disk 200. In each of the teeth 251 of the downstream fastening flange 250 is machined a fastening bore 220 allowing the fastening of the downstream flange 250 of the HP turbine disk 200 to the HP journal 100. The fastening of the HP journal 100 to the HP turbine disk 200 will be detailed hereinafter.

The HP Journal 100

With reference to FIGS. 2 and 3, the HP journal 100 takes the form of a piece of revolution, substantially flared in the upstream direction and extending along the axis of the engine. The HP journal 100 comprises, from upstream to downstream, a radial annular fastening part 150 designed to be fastened to the flange 250 of the HP turbine disk 200, a frustoconical part 102 and a longitudinal cylindrical part 103.

The longitudinal cylindrical part 103 of the HP journal 100, the most downstream part of the journal 100, comprises at its downstream end an external thread intended to receive an outer ring on which is mounted an inter-shaft bearing, this bearing (not shown) allowing the HP spool of the turbojet to be supported by the LP shaft.

With reference to FIG. 3, the frustoconical part 102 of the HP journal 100 comprises, for its part, a circumferential radial projecting portion 105, for mechanical reinforcement, oriented toward the axis of the engine and intended to reinforce the mass of the HP journal 100. The projecting portion 105 is formed in the vicinity of the axis of the engine in order to reduce the mechanical stresses in operation, in particular the stresses resulting from the centrifugal forces. The frustoconical part 102 of the HP journal 100 comprises radial sealing strips 104 forming a labyrinth seal, oriented radially toward the outside of the engine and intended to provide sealing between the HJP journal 100 and a mechanical part mounted outside the HP journal 100.

The frustoconical part 102 of the HP journal 100 additionally comprises an inner frustoconical flange 107 maintained secured to a sealing sleeve 400 of the LP shaft of the engine. The sealing sleeve 400 takes the form of a cylinder extending axially outside the LP shaft of the engine and inside the turbine disk 200. The sealing sleeve 400 makes it possible to protect the LP shaft against excessive temperatures. An annular air circulation duct for cooling the turbine disk is formed inside the HP turbine disk 200 and outside the sealing sleeve 400. The circulation of the cooling air in the duct is represented by arrows in FIGS. 2 and 3.

The radial annular fastening part 150 of the journal 100 comprises fastening bores 120 alternating with openings 110 for circulating an air flow for cooling the turbine disk, designated hereinafter as ventilation openings 110, the bores 120 and the openings 110 being arranged circumferentially on the radial annular fastening part 150. In this example, the bores 120 and the openings 110 are uniformly distributed over the circumference. The fastening bores 120 and the ventilation openings 110 of the journal 100 are formed so as to correspond respectively with the fastening bores 220 and the crenels 252 of the HP turbine disk 200.

The bores 120 and the openings 110 of the journal 100 advantageously make it possible to reduce the tangential stresses in this region of the HP journal 100, through a step effect.

The fastening bores 120 and the ventilation openings 110 are here circular and have, in this example, the same opening cross section. It goes without saying that the bores 120 and the openings 110 could have different shapes (oblong, rectangular, etc.) and cross sections.

The radial annular fastening part 150 additionally comprises radial sealing strips formed at its outer radial end, similar to those formed on the frustoconical part 102 of the journal 100.

In order to fasten the HP journal 100 to the HP turbine disk 200, the downstream-facing face of the downstream fastening flange 250 of the HP turbine disk 200 is brought into surface contact with the upstream-facing face of the radial annular part 150 of the HP journal 100. Then, the fastening bores 120 of the journal 100 are aligned with fastening bores 220 of the HP turbine disk 200. Owing to the alignment of the fastening bores 120, 220, the ventilation openings 110 of the HP journal 100 are aligned with the crenels 252 of the fastening flange 250 of the HP turbine disk 200. In other words, the ventilation openings 110 of the HP journal 100 are aligned with the openings formed between the teeth 251 of the fastening flange 250 of the HP turbine disk 200.

In order to maintain the HP turbine disk 200 secured to the HP journal 100, a screw 21 of a bolt is introduced successively into a fastening bore 120 of the journal 100 and then into the fastening bore 220 of the turbine disk 200 with which it is aligned. A nut 22 of the bolt is then screwed at the end of said screw 21 in order to secure the fastening. This bolting step is reiterated for each fastening bore 120 of the journal 100, the turbine disk 200 then being secured to the HP journal 100.

After fastening, the cooling air can circulate between the retaining bolts of the HP journal 100. The radial annular part 150 of the journal 100 allows the fastening to the turbine disk 200 and also the evacuation of the air flow for cooling the turbine disk 200.

Having described the structure of the means of the invention, its operation and its implementation will now be discussed.

With reference to FIGS. 2 and 3, during the operation of the turbojet, a mixture of air and fuel is burnt in the combustion chamber of the engine to create the thrust necessary to move the aircraft on which the turbojet is mounted. After combustion, a flow of gas at a very high temperature circulates in the HP turbine of the turbojet. The HP turbine disk 200 is subjected to very high temperatures.

In order to protect the HP turbine disk 200, a flow of air is extracted upstream of the turbine disk 200, at the HP compressor, and circulates from upstream to downstream in the turbojet, inside the HP turbine disk 200 and outside the sealing sleeve 400. During the circulation of the cooling air in the central bore 201 of the HP turbine disk 200, the annular cooling air flow extracts heat from the turbine disk 200 in order to cool it and forms a cooling air envelope around the sealing sleeve 400, thus protecting the mechanical parts mounted inside the latter.

After having cooled the HP turbine disk 200, the cooling air is evacuated through the air circulation passages which are formed between the bolts connecting the HP journal 100 to the HP turbine disk 200 as represented in FIGS. 2 and 3. Downstream of the air circulation openings, the cooling air cools the LP turbine of the twin-spool engine. In other words, the cooling air circulates successively between the teeth 251 of the downstream fastening flange 250 of the HP turbine disk 200 and through the ventilation openings 110 formed in the HP journal 100.

The Labyrinth Sealing Disk 300

According to another feature of the invention, a labyrinth sealing disk 300 is mounted with the HP turbine disk 200 and the HP journal 100, the sealing disk 300 being mounted downstream of the HP journal 100.

Figure 6:
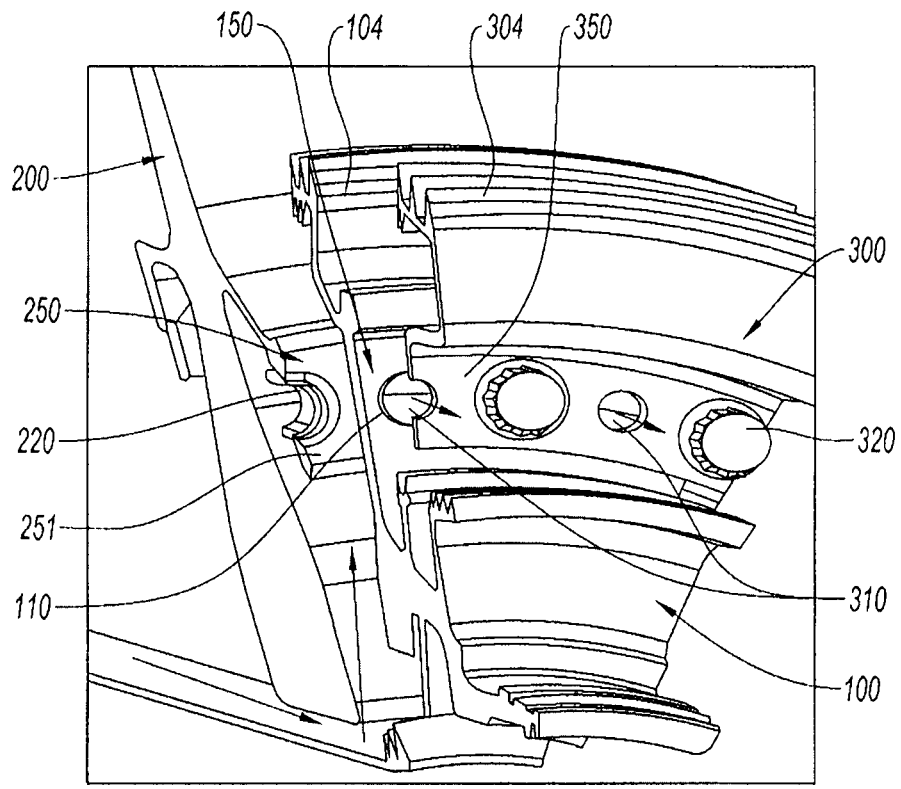
FIG. 6 represents partially, in perspective, a turbine disk, a journal and a labyrinth seal according to a second embodiment of the invention.

With reference to FIG. 6, the labyrinth sealing disk 300 takes the form of a radial annular ring comprising at its outer radial end, i.e. the end furthest from the axis of the engine, radial sealing strips 304 forming a labyrinth seal and comprising at its inner end, i.e. the end closest to the axis of the engine, a radial annular fastening band 350.

The radial annular fastening band 350 of the sealing disk 300 comprises fastening bores 320 alternating with ventilation openings 310, the bores 320 and the openings 310 being arranged circumferentially on the radial annular fastening band 350. The fastening bores 320 and the ventilation openings 310 of the sealing disk 300 are formed so as to correspond with their counterparts formed on the HP journal 100.

In order to fasten the sealing disk 300, the downstream-facing face of the downstream fastening flange 250 of the HP turbine disk 200 is brought into surface contact with the upstream-facing face of the radial annular part 150 of the HP journal 100. Then, the upstream-facing face of the fastening band 350 of the sealing disk 300 is brought into surface contact with the downstream-facing face of the radial annular part 150 of the HP journal 100.

Then, the fastening bores 120, 220, 320 of the HP turbine disk 200, of the HP journal 100 and of the sealing disk 300 are aligned. Owing to the alignment of the fastening bores 120, 220, 320, the ventilation openings 110, 310 of the HP journal 100 and of the sealing disk 300 are aligned with the crenels 252 of the fastening flange 250 of the HP turbine disk 200.

The turbine disk 200, the journal 100 and the sealing disk 300 are then bolted together via the fastening bores 120, 220, 320 which are aligned. After fastening, air circulation passages are formed between the retaining bolts.

The passage cross section of the ventilation openings 310 of the sealing disk 300 is adapted so as to be able to calibrate the circulation flow rate of the cooling air in the central bore 201 of the turbine disk 200. In this example, the diameter of the circular ventilation openings 310 of the sealing disk 300 is less than the diameter of the circular ventilation openings 110 of the HP journal 100, resulting in a reduction of the cooling air flow rate in the central bore 201.

The invention claimed is:

1. An assembly comprising:
a high-pressure turbine disk for a gas turbine engine, and
a bearing-supporting journal,
the high-pressure turbine disk comprising a radial annular fastening flange secured to a radial annular part of the journal by bolts, with a downstream face of the radial annular fastening flange of the high-pressure turbine disk abutting an upstream face of the radial annular part of the journal,
the bolts passing successively through first fastening bores formed in the radial annular fastening flange of the high-pressure turbine disk and through second fastening bores in the radial annular part of the journal,
wherein the radial annular fastening flange of the high-pressure turbine disk includes a crenelated radial annular band comprising teeth separated circumferentially by crenels, the first fastening bores being formed in the teeth,
wherein the radial annular part of the journal comprises air circulation openings circumferentially disposed between the second fastening bores on the radial annular part of the journal,
wherein the crenels of the radial annular fastening flange are circumferentially aligned with the air circulation openings disposed on the radial annular part of the journal,
wherein the teeth of the radial annular fastening flange of the high-pressure turbine disk extend radially toward an axis of the engine and present a free inner radial edge below the first fastening bores, and
wherein the crenels of the radial annular fastening flange of the turbine disk are open in a radial direction toward the axis of the engine such that each of the crenels are delimited by side surfaces of the teeth and an upper edge.

2. The assembly as claimed in claim 1, wherein the air circulation openings and the fastening bores are arranged circumferentially on the radial annular part of the journal.

3. The assembly as claimed in claim 1, wherein the journal comprises a frustoconical part, downstream of its radial annular part, comprising an inner radial portion for mechanical reinforcement.

4. The assembly as claimed in claim 3, wherein an upstream face of the inner radial portion of the journal directly faces a downstream face of a central bore of the high-pressure turbine disk.

5. The assembly as claimed in claim 1, wherein a sealing disk, mounted downstream of the journal, is bolted with the journal and the turbine disk, the sealing disk comprising circulation openings which are aligned with the air circulation openings of the journal.

6. The assembly as claimed in claim 5, wherein the passage cross section of the circulation openings of the sealing disk is adapted in order to calibrate the air circulation flow rate.

7. A cooling circuit for the turbine disk in a gas turbine engine comprising an evacuation passage, downstream of the turbine disk, passing through said openings of the assembly as claimed in claim 1.

8. The cooling circuit as claimed in claim 7, further comprising an upstream passage through a central bore of the turbine disk, upstream of the openings of said assembly.

9. A cooling circuit as claimed in claim 1 in a twin-spool engine comprising a high-pressure turbine and a low-pressure turbine, the turbine of said assembly being the high-pressure turbine, which circuit comprises a downstream passage, formed downstream of the openings of said assembly, in order to cool in part the low-pressure turbine.

* * * * *